United States Patent [19]

Large

[11] Patent Number: 5,086,995
[45] Date of Patent: Feb. 11, 1992

[54] AFT CANTILEVERED WING LANDING GEAR FOR HEAVY AIRPLANE WITH AFT CENTER OF GRAVITY

[75] Inventor: David T. Large, Everett, Wash.

[73] Assignee: The Boeing Company, Seattle, Wash.

[21] Appl. No.: 507,112

[22] Filed: Apr. 9, 1990

[51] Int. Cl.⁵ .......................................... B64C 25/12
[52] U.S. Cl. ............................................. 244/102 R
[58] Field of Search ........ 244/102 R, 102 SS, 102 SL

[56] References Cited

U.S. PATENT DOCUMENTS

| | | | |
|---|---|---|---|
| 1,887,357 | 11/1932 | Loening | 244/102 |
| 2,021,439 | 11/1935 | Wells | 244/2 |
| 2,141,534 | 12/1938 | Hudson | 244/49 |
| 2,459,737 | 1/1949 | Allen | 305/10 |
| 2,487,548 | 11/1949 | Hawkins | 244/102 |
| 2,490,485 | 12/1949 | Spaeth | 244/102 |
| 2,497,880 | 2/1950 | Gassner | 244/102 |
| 2,510,969 | 6/1950 | Gassner | 244/102 |
| 2,659,555 | 11/1953 | Schlender | 244/102 |
| 2,869,806 | 1/1959 | Beach | 244/102 |
| 2,974,909 | 3/1961 | Perdue | 244/102 |
| 3,322,376 | 5/1967 | Neilson et al. | 244/102 |
| 3,514,057 | 5/1970 | Biggs | 244/102 R |
| 3,544,043 | 12/1970 | Stratford | 244/104 |
| 3,687,400 | 8/1972 | Fitzgerald et al. | 244/102 |
| 3,784,131 | 1/1974 | Stratford | 244/102 |
| 3,807,667 | 4/1974 | Lucien et al. | 244/102 |
| 4,047,681 | 9/1977 | Hartel | 244/102 |
| 4,147,316 | 4/1979 | Kendall et al. | 244/102 |
| 4,170,332 | 10/1979 | Masclet et al. | 244/102 |
| 4,199,119 | 4/1980 | Masclet | 244/102 |
| 4,312,485 | 1/1982 | Masclet et al. | 244/102 |
| 4,412,665 | 11/1983 | Krammer et al. | 244/102 |
| 4,638,962 | 1/1987 | Gunter et al. | 244/203 |

FOREIGN PATENT DOCUMENTS

| | | | |
|---|---|---|---|
| 00131601 | 7/1981 | European Pat. Off. | 244/102 R |
| 1442334 | 9/1966 | France . | |
| 1568784 | 4/1969 | France | 244/102 SS |
| 526116 | 9/1940 | United Kingdom . | |
| 663245 | 12/1951 | United Kingdom . | |
| 1182715 | 3/1970 | United Kingdom | 244/102 R |
| 1423895 | 2/1976 | United Kingdom . | |

*Primary Examiner*—Galen Barefoot
*Attorney, Agent, or Firm*—Glenn D. Bellamy

[57] ABSTRACT

A retractable wing-mounted landing gear (10) for a heavy airplane with an aft center of gravity includes a trunnion (12), an aftly-cantilevered strut member (26), a ground-contacting wheel assembly (44, 46), and a folding drag brace (30). The trunnion (12) is operably mounted to the wing (14) for pivotal movement about a substantially forward and aft axis of rotation. The trunnion (12) is rotatable to cause substantially lateral movement of the gear (10) between in-use and stored positions. The strut member (26) has upper and lower ends, the upper end being pivotally connected (28) to the trunnion (12) for relative forward and aft movement thereto. The pivotal connection (28) has an axis of rotation substantially perpendicular to that of the trunnion (12). The ground-contacting wheel assembly (44, 46) is operably connected to the lower end (54) of the strut member (26). The folding drag brace (30) extends between the lower end (54) of the strut member (26) and a location on the aircraft spaced forwardly from the strut member (26). The folding drag brace (30) is movable between an in-use stabilizing position and a stowed position in which the drag brace (30) folds to permit relative forward and aft movement of the strut member (26). The strut member (26) is cantilevered aftly relative to the trunnion (12) when the gear (10) is in the in-use position. The strut member (26) pivots relatively forwardly for lateral, inboard retraction of the gear (10) to the stowed position.

8 Claims, 3 Drawing Sheets

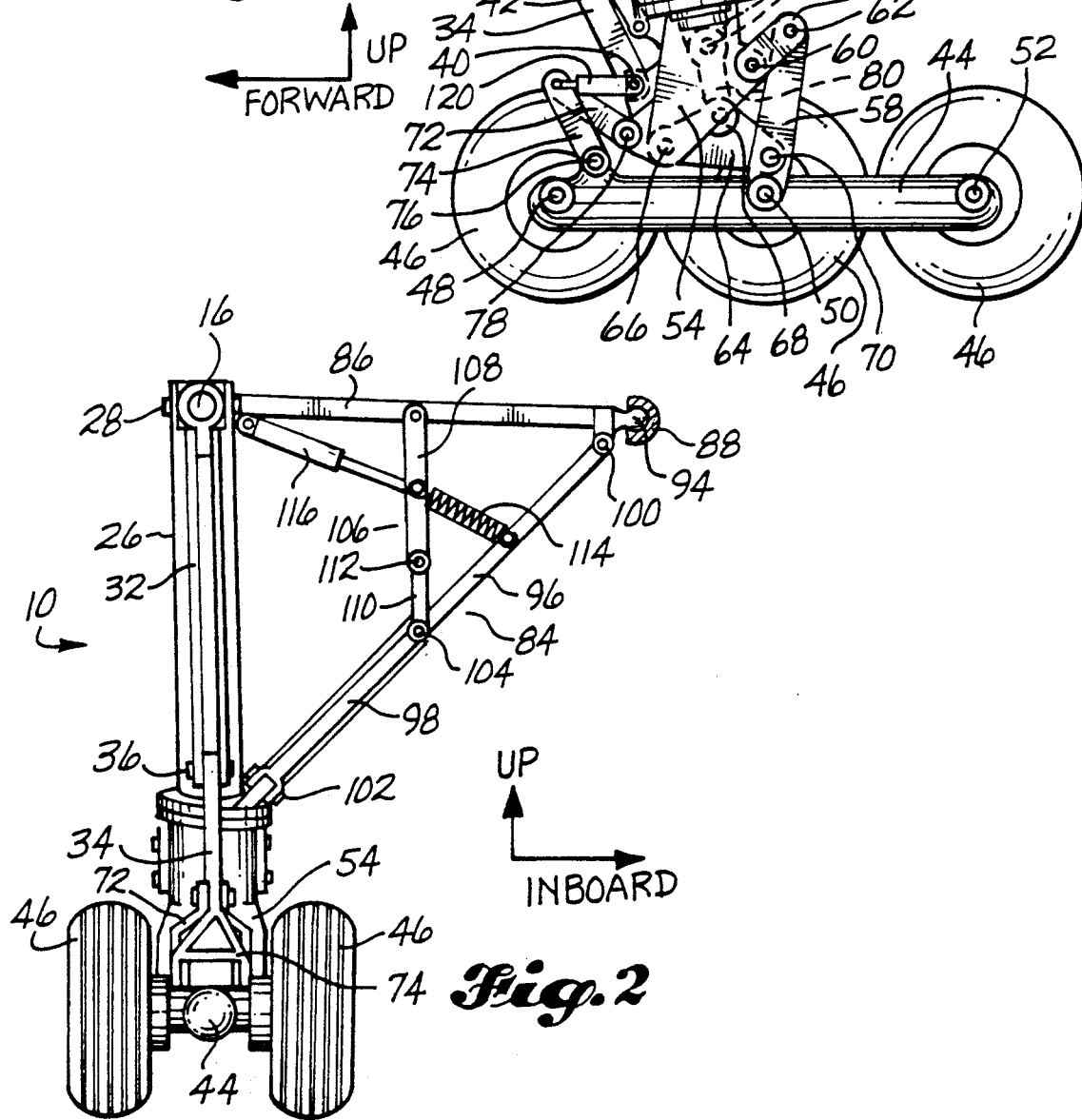

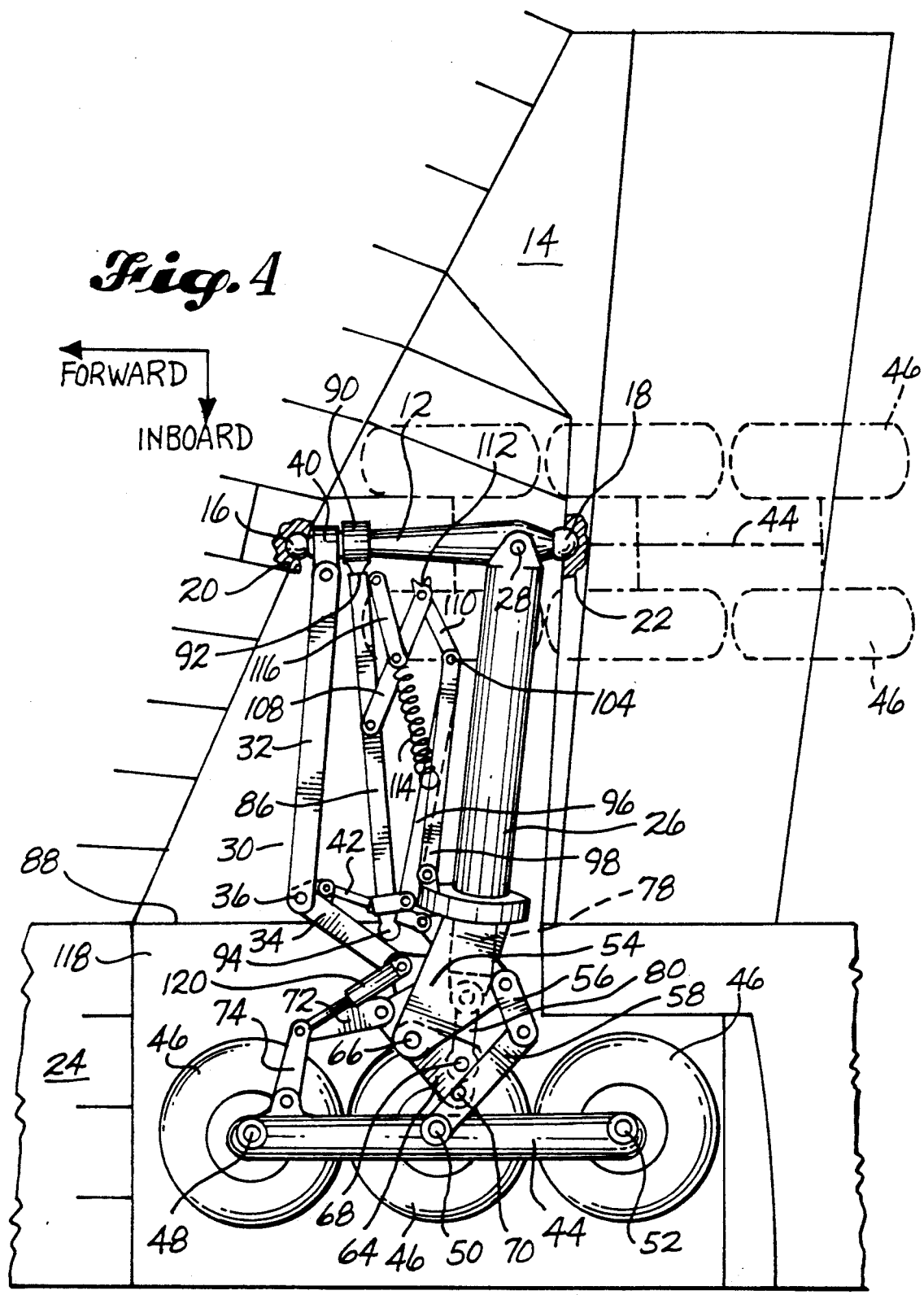

AFT CANTILEVERED WING LANDING GEAR FOR HEAVY AIRPLANE WITH AFT CENTER OF GRAVITY

DESCRIPTION

1. Technical Field

This invention relates to a retractable wing-mounted landing gear, and in particular to such gear having a laterally-rotating trunnion, a forward/aft swinging shock strut, and a positioning drag brace which deploys the shock strut to cantilever aftly in use and to jack-knife fold during retraction, swinging the shock strut forward for lateral inboard stowage in a compact compartment.

2. Background Art

The design of landing gear for modern commercial aircraft is largely determined by load distribution, location of stowage space, and the ability of gear kinematics to move the gear between stowed and operable positions. Load distribution includes consideration of both distribution of support on the aircraft frame and wings as well as runway loading. Commonly, the main landing gear for relatively heavy airplanes with an aft center of gravity, such as the Boeing 767, are wing-mounted and body-stowed. As gross weights of such aircraft have increased to as much as 520,000 pounds, or even 570,000 pounds, and as the center of gravity in such aircraft has shifted aftly, the load on landing gear has correspondingly increased and shifted.

Increasing the capacity of wing-mounted gear is often complicated by the concurrent increase in wing sweep. This problem has previously been addressed by the addition of costly, heavy and bulky multi-gear installations which include one or more body-mounted, body-stowed gear. Such installations are currently used on A330/340, DC-10, and 747 models. This solution, however, significantly compromises airplane weight and cost, and greatly reduces potential body cargo space.

In an attempt to modify existing wing gear configurations to compensate for increased gross weight, aft center of gravity, and highly swept wings, gear configurations using a skewed trunnion have been tried. This solution nearly always entails an aerodynamic penalty for the containment space of added airfoil depth and/or add-on cover fairings.

Prior attempts to highly cantilever wing gears aftly have invariably been too complex or unreliable, have had high induced lateral loads which inhibit proper oleo travel, have required wing bumps which are large enough to significantly degrade airplane performance, and/or unacceptably increase the chord length of the added inboard aft wing area (Yehudi) to accommodate both the landing gear and adjacent low-speed, trailing-edge flaps.

SUMMARY OF THE INVENTION

The present invention provides a retractable, wing-mounted landing gear which successfully addresses these problems. The gear includes a trunnion pivotally mounted to the aircraft wing for rotation about a substantially forward and aft axis of rotation. A strut member is pivotally mounted at its upper end to the trunnion for relative forward and aft movement thereto. The pivotal connection between the strut member and trunnion has an axis of rotation substantially perpendicular to that of the trunnion. A folding drag brace extends between a lower end of the strut and a location on wing structure spaced forwardly from the strut's pivotal connection thereto. The folding drag brace is movable between an in-use stabilizing position and a stowed position in which it folds to permit and/or induce relative forward and aft movement of the strut member. A ground-contacting wheel assembly is operably connected to the lower end of the strut. The strut is cantilevered aftly from the trunnion when the gear is in a deployed position and is pivoted relatively forwardly for lateral inboard retraction of the gear.

The drag brace may include first and second elongated members pivotally jointed together at a central location such that when the gear is in an operable position, the members of the drag brace are longitudinally aligned. The members are displaceable from this alignment at the central pivotal connection to allow and/or induce forward movement of the strut for retraction and stowage of the gear.

A folding side brace may extend between the lower end of the strut to a position on the aircraft inboard of the trunnion. The side brace includes first and second elongated members pivotally jointed at a central location which are longitudinally aligned when the gear is in an operable position and which jack-knife at the pivotal connection upon retraction of the gear.

The strut member may include a shock-absorbing means or "oleo" which longitudinally reciprocates within the strut member in a well-known manner. In order to transfer the generally vertical forces placed on the wheel assembly to the aftly-cantilevered oleo, a unique base assembly which includes a "bell crank" linkage may be employed.

Other aspects and features of the present invention will become apparent upon examination of the various figures of the drawing, the detailed description of the best mode for carrying out the invention, and appended claims.

BRIEF DESCRIPTION OF THE DRAWINGS

Like reference numerals will be used to denote like parts throughout the various figures of the drawing, wherein:

FIG. 1 is an outboard side view of the left landing gear of the present invention (with outboard wheels removed) shown relative to a portion of the aircraft wing and with the stowed position of the gear shown in phantom;

FIG. 2 is a front view of the right gear shown in a fully-deployed position;

FIG. 4 is a top view of the right gear in a stowed position (inboard wheels removed) shown relative to aircraft wing and body structure, and with the deployed position of the gear shown in phantom.

BEST MODE FOR CARRYING OUT THE INVENTION

Figure 3:
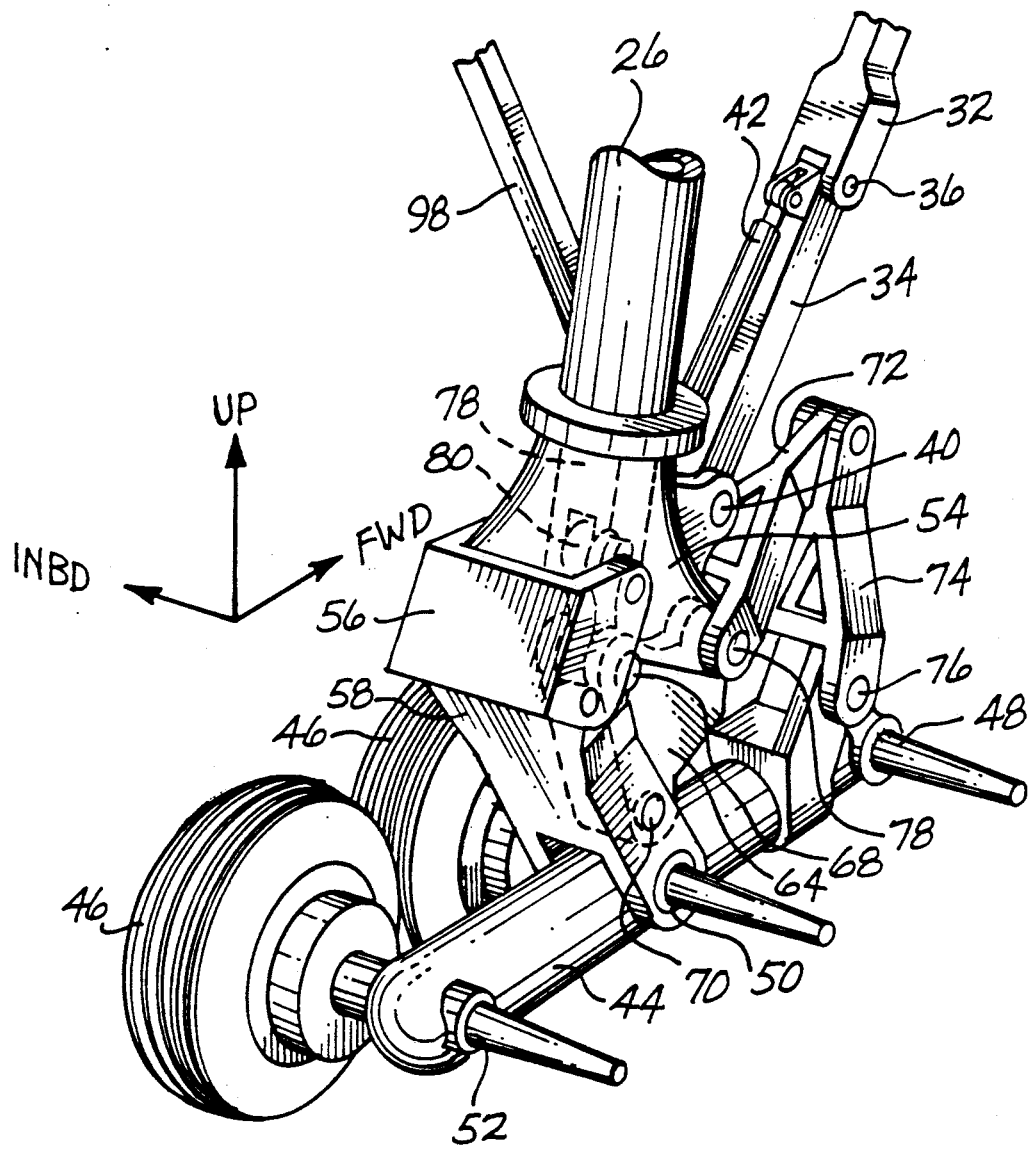
FIG. 3 is a fragmentary pictorial view of the right landing element (outboard wheels removed) and its connection to the lower end of the oleo strut.

Referring to the several figures of the drawing, and first to FIG. 1, therein is shown at 10 the preferred embodiment of a retractable landing gear of the present invention in a fully deployed, loaded position. The gear 10 includes a trunnion 12 mounted to an aircraft wing 14 in a substantially forward and aft position having opposite end portions 16, 18 which are pivotally mounted to the wing 14 at spar mount fittings 20, 22. The trunnion 12 is rotatable about a longitudinal axis which extends substantially forward and aft within wing 14. The trunnion 14 is positioned substantially parallel to the longitudinal extension of the aircraft body 24.

Downwardly extending from the trunnion 12 is an oleo strut 26. The strut 26 is pivotally mounted at its upper end to the trunnion 12 at an aftward point 28 on the trunnion 12. The strut 26 is able to swing forwardly and aftly relative to the trunnion 12 about the pivot 28 which has an axis of rotation substantially perpendicular to that of the trunnion 12. A drag brace 30 extends between the lower end of the strut 26 and forward end of the trunnion 12. The drag brace is comprised of two elongated members 32, 34 which are pivotally joined together 36 at a central location. The upper member 32 of the drag brace 30 is pivotally connected 38 to a mounting collar 40 at the forward end of the trunnion 12. The lower member 34 of the drag brace 30 is pivotally connected 40 to the lower end of the strut 26. When the gear 10 is in its fully deployed position, as shown in FIGS. 1, 2, and 3, the upper and lower members 32, 34 of the drag brace 30 are substantially longitudinally aligned. The members 32, 34 are held in alignment by a locking actuator 42 which extends generally between the folding joint 36 of the drag brace 30 and the strut 26. In this in-use position, the strut 26 is held in a position which is cantilevered aftly from its pivotal connection 28 to the trunnion 12.

Referring now also to FIG. 3, attached to the lower end of the strut 26 is a wheel assembly which includes a main beam 44 and six wheels 46 mounted on three tandem axles 48, 50, 52. The lower end of the strut 26 includes a forwardly offset yoke portion 54. The wheel assembly is connected to this yoke portion 54 through a pair of two-member torque linkages. The forward torque linkage includes a pair of pivotally connected members 72, 74 which extend between a forward position 76 on the main beam 44 of the wheel assembly and a point 78 on the yoke 54 of the strut 26. The rearward, main torque linkage includes a relatively short upper member 56 and a relatively long lower member 58. The upper member 56 is pivotally connected (at 60) to an upper, rearward position on the yoke 54. The upper member 56 is joined to the lower member 58 at a central, pivotal joint 62. The lower member 58 is pivotally attached to the main beam 44 of the wheel assembly at a pivotal connection having an axis of rotation congruent with that of the center axle 50 of the wheel assembly.

A substantially triangular tie link 64 having three points of pivotal connection 66, 68, 70 in a single plane joins the lower member 58 of the main torque linkage to the yoke portion 54 of the strut 26. The tie link 64 extends between a forward, lower position fixed pivot 66, which connects the yoke 54 and the tie link 64, and a pivotal connection 70 between the tie link 64 and lower member 58 of the main torque linkage. In this manner, the wheel assembly is able to move in an upward and downward direction relative to the strut 26. The connection between the wheel assembly and yoke portion 54 is in the form of a modified four-bar linkage. Pivot points 60 and 66 are fixed in space relative to the strut 26 and aircraft wing 14. Pivot points 62 and 70 float in response to movement of the wheel assembly. Torsional forces placed on the wheel assembly during turning of the aircraft are transferred to the yoke portion 54 of the strut 26 through the forward and rear torque linkages.

The strut 26 includes an internally reciprocating "oleo" which is in the nature of a shook absorber. As is well-known per se, it comprises a shock absorbing spring means which tends to bias a reciprocating member 78 of the strut longitudinally outwardly from the fixed portion of the strut 26. The triangular tie link 64 is connected to this reciprocating member 78 of the strut through a pivotal link 80. The pivotal link 80 extends between the third pivot point 68 on the tie link 64 and a pivotal connection 82 at the lower end of the reciprocating member 78 of the oleo strut.

When the weight of the aircraft is sitting on the landing gear, the reciprocating member 78 of the oleo strut is moved relatively upwardly into the fixed portion of the strut 26. Weight is transferred between the beam 44 of the wheel assembly through the lower member 58 of the main torque linkage, the substantially triangular tie link 64 and the pivotal tie linkage 80. The first pivot point 66 of the tie linkage 64 is fixed in position relative to the yoke portion 54 of the strut 26. The other two pivot points 68, 70 of the member 64 are movable relative thereto along an arc defined by their respective radii from the fixed pivot 66. In this manner, the member 64 acts as an acutely-angled "bell crank" to transfer force between the wheel assembly and reciprocating oleo member 78 and to change the direction of such force from a substantially vertical direction to the aftly-angled direction of linear reciprocation of the oleo member 78.

Strictly speaking, a bell crank is defined as a lever or rocker having two arms meeting a pivot at a right angle which is used for transmitting motion between two parts meeting only at an angle. As used herein, the term is not limited to a pair of arms meeting only at a right angle, but rather broadly to a member which transfers directional motion about a common pivot point, regardless of the angle utilized.

In the illustrated embodiment, the member 64 is in the shape of a solid triangle, rather than separate arms intersecting at a common pivot point 66. The shape of the member 64 in no way diminishes its mechanical function. Because the member 78 is restricted to movement substantially longitudinal of the strut 26, the pivotal linkage 80 compensates for the slight relative forward and aft rotational movement which occurs as the member 64 is pivoted about its fixed pivot point 66. The lower member 58 of the aft torque linkage extends beyond its pivotal connection to the tie link 64 and acts substantially as a "lever of the second class." A lever of the second class is one in which the fulcrum is at one end, the effort at the other, and the load at a point therebetween. In the illustrated embodiment, pivot point 62, although not rigidly fixed in space, acts as the fulcrum. Effort is applied to the lever 58 at its opposite end where the beam 44 of the wheel assembly is pivotally attached 50. The load is applied at the pivotal connection 70 between the member 58 and the tie link 64. In mechanical terms, force is transferred from the wheel assembly to the lower member 58 of the aft torque linkage which acts as a lever. The force is transferred to the tie link 64 which, in turn, acts as a bell crank to change the direction of the force toward that of the longitudinally reciprocating member 78 of the oleo. An additional pivotal linkage 80 is imposed therebetween to compensate between the arcuate movement of the tie link 64 and linear movement of the reciprocating member 78. In this manner, substantially all lateral loads on the oleo are eliminated.

FIG. 3 shows the wheel assembly and torque linkage in an unloaded, free hanging condition while FIG. 1 shows the position of the linkage in a loaded condition. The upper member 56 of the aft torque linkage allows relative flotation of the fulcrum point 62 of the lower member 58. The forward and aft torque linkages 56, 58, 72, 74 serve to couple the wheel assembly to the strut 26 allowing free telescopic movement of the reciprocating member 78 while transferring torque forces to the fixed yoke 54 of the strut 26.

Referring now also to FIG. 2, extending substantially between the lower end of the strut 26 and an inboard position on the aircraft frame is a folding side brace 84. The side brace mechanism includes a tie bar 86 which extends generally from the trunnion 12 inboard to the side of body rib fitting 88 on the aircraft frame. The tie bar 86 is attached to a collar 90 on the trunnion 12 which rotates freely relative to the trunnion 12. This is shown clearly in FIG. 1. A rotatable joint 92 between the tie bar 86 and the collar 90 allows the tie bar 86 to rotate about a longitudinal axis. A similar pivot connection 94 at the inboard end of the tie bar 86 also allows the tie bar 86 to pivot relative to the side of body rib fitting 88.

The side brace 84 includes first and second jointed members 96, 98. The upper member 96 is pivotally attached 100 at its upper end to the inboard end of the tie bar 86. The lower member 98 is pivotally attached 102 at its lower end to the strut 26. The upper and lower members 96, 98 are centrally jointed together 104 for relative folding movement to permit retraction of the gear 10. When the gear 10 is in its fully deployed position, the side brace 84 is supported so that its upper and lower members 96, 98 are longitudinally aligned by a folding brace link 106 which extends between the tie bar 86 and the joint 104 between the upper and lower members 96, 98. The brace link includes first and second members 108, 110 pivotally attached together with a locking knee joint 112. The knee joint 112 prohibits folding movement of the members 108, 110 beyond a longitudinally aligned position. The joint 112 is biased into a locked position by a tension spring 114. The force of the spring 114 is overcome for folding movement of the brace link 106 by a suitably positioned actuator 116.

As can be readily seen in FIG. 1, the gear strut 26 is cantilevered significantly aftly when the gear 10 is in its fully deployed position. This allows the wheel assembly to contact the ground significantly aftly of the trunnion's 12 attachment to the wing 14 and the strut's 26 attachment 28 to the trunnion 12. This position is shown in phantom in FIG. 4. In this manner, the weight of the aircraft is more aftly distributed without the need for body gear. To move the gear 10 between the deployed position shown in FIG. 1 and the stowed position shown in FIG. 4, the strut 26 must be swung forwardly relative to the trunnion 12 and wing 14. In the fully extended position the strut 26 is braced against such movement by the drag brace 30. In order to allow the forward motion of the strut 26, the length of the drag brace 30, or distance between end connections 38, 40, must be effectively shortened. This is accomplished by actuator 42 forwardly folding the drag brace 30 at its pivotal connection 36. The actuator 42 serves to both release the upper and lower members 32, 34 from their axially aligned position and to propel the forward movement of the strut 26 by extension of the actuator 42. This can be readily seen in FIG. 4. At essentially the same time, actuator 116 causes the upper and lower members 108, 110 of the locking brace 106 to be displaced from their longitudinally aligned positions, in turn causing the upper and lower members 96, 98 of the side brace 84 to be displaced from their longitudinally aligned positions at their pivotal connection 104. This will allow the side brace 84 to fold upon itself and stow in the space between the strut 26 and drag brace 30, as shown in FIG. 4.

The drag and side braces 30, 84 having been released, and the strut 26 having been swung forwardly, the trunnion 12 may be rotated to move the strut 26 and wheel assembly laterally inboard to a stowed position such that the wheel assembly is stowed in a body wheel well compartment 118 and the strut 26, along with side and drag braces 84, 30, are stowed in the cavity of wing 14. Rotation of the trunnion 12 may be accomplished by any of a number of well-known means such as a rotary actuator acting upon the trunnion 12 or a linear hydraulic actuator mounted horizontally within the wing 14 and acting upon a radially outwardly extending ear or crank arm (not shown) of the trunnion 12. Such rotational means is characteristically designed to allow "free-fall" gear deployment and locking for use, should actuation power fail. In order to fit the wheel assembly most compactly into a body stowage compartment 118 its main beam 44 must be rotated relative to the strut 26 about its pivotal connection 50. This may be accomplished by an actuator 120 which extends between the yoke 54 of the strut 26 and the forward torque linkage 72, 74. Any of a variety of selected positions for this actuator may be utilized. Because the wheel assembly will normally hang free in the appropriate landing position when the gear 10 is extended, the actuator 120 is needed only for positioning of the wheel assembly for stowage. The preferred stowed position of the wheel assembly is with the beam 44 in a substantially forward and aft direction, as shown in FIG. 4. The present invention may be embodied in a variety of forms, depending upon the particular application in which it is used. For example, depending upon the loading requirements, the wheel assembly may be in the form of a single or double axle, or even four-axle, configuration. The selection of tire diameter may also vary depending upon loading requirements. Additionally, the particular angle at which the strut 26 is cantilevered will depend upon the placement of the gear 10 on the wing 14 and position of the center of gravity of the aircraft in general. The particular construction of the drag and side braces 32, 84 may be varied as well as the structure of the oleo base/torque linkage assembly. The illustrated and described embodiment is but one example of the present invention. Therefore, patent protection is not to be limited by this illustrated embodiment, but rather by the following claim or claims interpreted according to accepted doctrines of claim interpretation, including the doctrine of equivalents.

What is claimed is:

1. In an aircraft having a body and a wing, a retractable wing-mounted landing gear, comprising:
   a trunnion operably mounted to said wing for pivotal movement about a substantially forward and aft axis of rotation, said trunnion rotatable to cause substantially lateral movement of said gear between in-use and stowed positions;
   a strut member having upper and lower ends, said upper end being pivotally connected to said trunnion for relative forward and aft movement thereto, said pivotal connection having an axis of rotation substantially perpendicular to that of said trunnion;

a ground-contacting wheel assembly operably connected to said lower end of said strut member;

a folding drag brace extending between said lower end of said strut member and a location on said aircraft spaced forwardly from said strut member, said folding drag brace being movable between an in-use stabilizing position and a stowed position in which said drag brace folds to permit relative forward and aft movement of said strut member; and said strut member being cantilevered aftly relative to said trunnion which said gear is in said in-use position and said strut member pivoting relatively forwardly for lateral inboard retraction of said gear to said stowed position, wherein said strut member includes a shock-absorbing means having a longitudinally reciprocating portion, and wherein the connection between said wheel assembly and said strut member includes a bell crank member having first and second lever portions and a pivot point therebetween, said pivot point being at a pivotal connection between said bell crank member and said strut member, said first lever portion operably connected to said wheel assembly and said second lever portion operably connected to transfer vertical force from said wheel assembly to said longitudinally reciprocating portion of said shock-absorbing means.

2. The landing gear of claim 1, wherein said connection between said wheel assembly and said strut member further includes a folding torque linkage operably positioned to transfer torsional force on said wheel assembly to a fixed portion of said strut member, said folding torque linkage being positioned to transfer vertical movement of said wheel assembly to said first lever portion of said bell crank member.

3. In an aircraft having a body and a wing, a retractable wing-mounted landing gear, comprising:

a trunnion operably mounted to said wing for pivotal movement about a substantially forward and aft axis of rotation, said trunnion rotatable to cause substantially lateral movement of said gear between in-use and stowed positions;

a strut member having upper and lower ends, said upper end being pivotally connected to said trunnion for relative forward and aft movement thereto, said pivotal connection having an axis of rotation substantially perpendicular to that of said trunnion;

a ground-contacting wheel assembly operably connected to said lower end of said strut member;

a folding drag brace extending between said lower end of said strut member and a location on said aircraft spaced forwardly from said strut member, said folding drag brace being movable between an in-use stabilizing position and a stowed position in which said drag brace folds to permit relative forward and aft movement of said strut member; and said strut member being cantilevered aftly relative to said trunnion when said gear is in said in-use position and said strut member pivoting relatively forwardly for lateral inboard retraction of said gear to said stowed position, wherein said trunnion extends substantially forward from said pivotal connection of said strut member a distance which is sufficient to allow said drag brace to attach to said trunnion at a forward end such that said drag brace extends between said lower end of said strut member and said trunnion.

4. The landing gear of claim 3, wherein said drag brace includes first and second elongated members pivotally jointed together, said members being substantially longitudinally aligned when in said in-use stabilizing position and said members folding relative to one another at said pivotal connection for movement to said stowed position.

5. The landing gear of claim 4, wherein said drag brace further includes a locking/actuation means for maintaining said members in said longitudinal alignment in said in-use position and for displacing said members from said longitudinal alignment, said means causing said strut member to pivot relatively forwardly and aftly.

6. In an aircraft having a body and a wing, a retractable wing-mounted landing gear, comprising:

a trunnion operably mounted to said wing for pivotal movement about a substantially forward and aft axis of rotation, said trunnion rotatable to cause substantially lateral movement of said gear between in-use and stowed positions;

a strut member having upper and lower ends, said upper end being pivotally connected to said trunnion for relative forward and aft movement thereto, said pivotal connection having an axis of rotation substantially perpendicular to that of said trunnion;

a ground-contacting wheel assembly operably connected to said lower end of said strut member;

a folding drag brace extending between said lower end of said strut member and a location on said aircraft spaced forwardly from said strut member, said folding drag brace being movable between an in-use stabilizing position and a stowed position in which said drag brace folds to permit relative forward and aft movement of said strut member; and said strut member being cantilevered aftly relative to said trunnion when said gear is in said in-use position and said strut member pivoting relatively forwardly for lateral inboard retraction of said gear to said stowed position, further comprising a folding side brace extending between said lower end of said strut member and a location on said aircraft spaced inboard from said strut member, said side brace being movable between an in-use stabilizing position and a stowed position which said side brace folds to permit relative inboard retraction of said gear.

7. The landing gear of claim 6, wherein said folding side brace includes first and second elongated members pivotally jointed together, said members being substantially longitudinally aligned when said side brace is in said in-use stabilizing position and folding relative to one another at said pivotal connection for movement to said stowed position.

8. The landing gear of claim 7, wherein said side brace further includes a releasable locking means for maintaining said members in said longitudinal alignment while in said in-use position, said means being releasable to allow relative folding movement of said elongated members.

* * * * *

UNITED STATES PATENT AND TRADEMARK OFFICE
CERTIFICATE OF CORRECTION

PATENT NO. : 5,086,995
DATED : February 11, 1992
INVENTOR(S) : David T. Large

It is certified that error appears in the above-identified patent and that said Letters Patent is hereby corrected as shown below:

In the Abstract, 9th line from the top, "stored" should be
-- stowed --.
Column 4, line 2, "shook" should be -- shock --.
Claim 1, column 7, line 13, "which" should be -- when --.

Signed and Sealed this

Twenty-second Day of June, 1993

Attest:

MICHAEL K. KIRK

Attesting Officer

Acting Commissioner of Patents and Trademarks